United States Patent [19]

Kawakubo

[11] Patent Number: 5,757,981
[45] Date of Patent: May 26, 1998

[54] IMAGE INSPECTION DEVICE

[75] Inventor: Takashi Kawakubo, Hashimoto, Japan

[73] Assignee: Toyo Ink Mfg. Co., Ltd., Japan

[21] Appl. No.: 862,237

[22] Filed: May 23, 1997

Related U.S. Application Data

[63] Continuation of Ser. No. 400,667, Mar. 8, 1995, abandoned, which is a continuation of Ser. No. 932,879, Aug. 20, 1992, abandoned.

[51] Int. Cl.$^6$ .................. G06K 9/32; G06K 9/00
[52] U.S. Cl. .................. 382/293; 382/112; 348/129
[58] Field of Search ........................ 382/112, 168, 382/170–171, 174, 206, 209, 293–294, 295–296, 278, 216–218; 348/88, 92, 129–130; 250/559.01, 559.2, 559.39

[56] References Cited

U.S. PATENT DOCUMENTS

| | | | |
|---|---|---|---|
| 3,803,553 | 4/1974 | Nakano et al. | 382/28 |
| 4,677,680 | 6/1987 | Harima et al. | 382/45 |
| 4,688,088 | 8/1987 | Hamazaki et al. | 382/18 |
| 4,858,128 | 8/1989 | Nowak | 382/44 |
| 5,058,175 | 10/1991 | Aso | 382/112 |
| 5,125,037 | 6/1992 | Lehtonen et al. | 382/112 |
| 5,133,020 | 7/1992 | Giger et al. | 382/18 |
| 5,144,566 | 9/1992 | Anderson et al. | 382/112 |
| 5,384,859 | 1/1995 | Bolza-Schunemann et al. | 382/112 |

*Primary Examiner*—Leo Boudreau
*Assistant Examiner*—Bhavesh Mehta
*Attorney, Agent, or Firm*—Graham & James LLP

[57] ABSTRACT

An image inspection device includes correlation calculating device for calculating a correlation value between sample image data and reference image data and correction device for correcting the sample image data according to the calculated correlation value. A comparator compares the corrected sample image data with the reference image data. The correlation value can be a correlation between an X-direction projection pattern and a Y-direction projection pattern, or the correlation value can be a density distribution correlation. With the projection pattern correlation, the read timing of the reference image data for the comparison is delayed according to the correlation value. With the density distribution correlation, the density distribution of the sample image data is corrected according to the correlation value.

6 Claims, 7 Drawing Sheets

IMAGE INSPECTION DEVICE

This is a continuation of application Ser. No. 08/400,667 filed on Mar. 8, 1995, now abandoned, which is a continuation of Ser. No. 07/932,879 filed on Aug. 20, 1992, now abandoned.

BACKGROUND OF THE INVENTION

1. Field of the Invention

The present invention relates to an image inspection device for judging whether a sample image is flawless by comparing the sample image detected by means of an image detection means with a prestored reference image.

2. Description of the Prior Art

When comparing sample image data with reference image data in a comparing means, both the images must be completely aligned, and therefore it is necessary to synchronize reading of the sample image with reading of the reference image.

Therefore, in a conventional image inspection device, read timing of the reference image in the comparing means has been determined according to sample image detection timing at a specified position in a sample image transfer path. For example, when performing image inspection on a printed product as a sample image in a rotary press for printing use, a rotary encoder is provided at a sheet feeder section storing a roll-shaped sheet for printing. Then the amount of sheet supply is perceived by means of an output of the rotary encoder to adjust the read timing of the reference image based on the amount of sheet supply.

However, any conventional image inspection device has been mechanically detecting the amount of movement of the sample image to determine read timing of the reference image based on the detection result. Therefore, for example, when an image is formed continuously on a lengthy sheet, it is impossible to detect any error in the image forming position due to the expansion or contraction of the sheet. Therefore, it has been impossible to correctly align both the images in the comparing means for comparing the sample image data with the reference image data, which also results in an impossibility in judging whether the sample image is flawless. In an image inspection device for judging whether a sample image of such as a printed product is flawless, generally sample image data detected by means of a sensor is compared with prestored reference image data one pixel by one pixel to detect the possible occurrence of smear and defective density distribution of the sample image. For example, when a white background portion of the sample image is smeared, a great difference in density takes place between the sample image data and the reference image data, and by detecting the difference in density, the occurrence of smear can be perceived.

When the density of the sample image varies uniformly in a specific range as compared with the density of the reference image, the sample image can be assumed to be normal. However, even in the above case, the sample image data is compared with the reference image data one pixel by one pixel in the conventional image inspection device, and a difference in density takes place between both the images to problematically make a judgment that the sample image is defective. The conventional image inspection device has been unable to discriminate a uniform density variation in the entire image from smear or defective density distribution to fail in correctly detecting only the defective image.

SUMMARY OF THE INVENTION

Accordingly, it is an object of the present invention to provide an image inspection device which is capable of correctly judging whether a sample image is flawless by obtaining an error in position of a sample image with respect to a reference image through calculating a correlation between a projection pattern of the sample image data and a projection pattern of the reference image and by adjusting read timing of the reference image in comparing means based on the calculation result to accurately align the sample image with the reference image in the comparing means.

Another object of the present invention is to provide an image inspection device which is capable of correctly detecting only such defective phenomena as smear and density nonuniformity by firstly correcting the sample image data so that the density distribution of the sample image approximately coincides with the density distribution of the reference image and then comparing the resulting image with the reference image in order to compare the sample image data with the reference image data on the same density level.

In accordance with the present invention, an image inspection device comprises optical sensor means for reading sample image data and reference image data of a printed sheet or the like, correlation calculating means for calculating a correlation value between the sample image data read and the reference image data, correction means for correcting the sample image data according to the correlation value calculated by the correlation calculating means, and comparison means for comparing the corrected sample image data by the correction means with the reference image data.

The correlation value can be a correlation between an X-direction projection pattern and a Y-direction projection pattern, and also can be a density distribution correlation. With the projection pattern correlation, the read timing of the reference image data for the comparison is delayed according to the correlation value. With the density distribution correlation, the density distribution of the sample image data is corrected according to the correlation value.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 2:
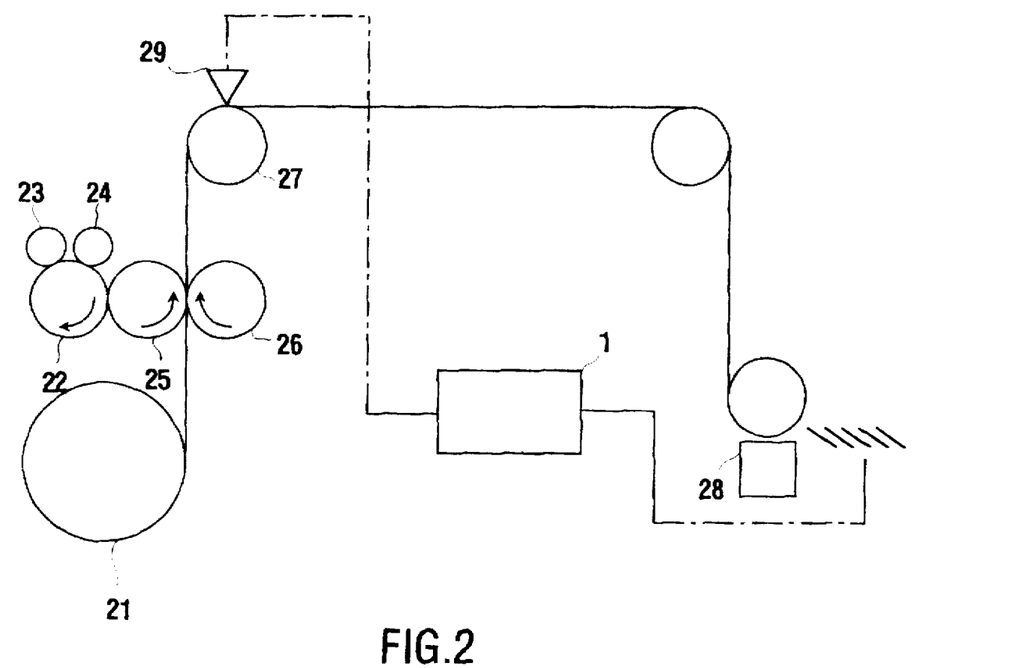
FIG. 2 is a schematic view of a printing machine to which the image inspection device shown in FIG. 1 is applied.

FIG. 2 is a schematic view of a printing machine to which an image inspection device is applied in accordance with an embodiment of the present invention.

In a newspaper printing rotary press, a sheet 21 stored in a roll form is guided in between a rubber roller 25 and a platen roller 26. The rubber roller 25 is in contact with a plate roller 22. To the plate roller 22 are supplied water and ink from a water roller 23 and an ink roller 24 to selectively apply ink onto a plate wound around the plate roller 22. Then the ink is offset onto the rubber roller 25 in contact with the plate roller 22 to be subsequently transferred onto the sheet which is transferred between the rubber roller 25 and the platen roller 26. An optical line sensor 29 is provided opposite to a roller 27 constituting a part of the transfer path of the sheet 21. A sample image is detected by means of the optical line sensor 29 and then compared with a reference image prestored in an image inspection device 1. After cutting off an impaired image having a smear and defective density distribution by means of a cutter 28, the impaired image is removed.

Figure 1:
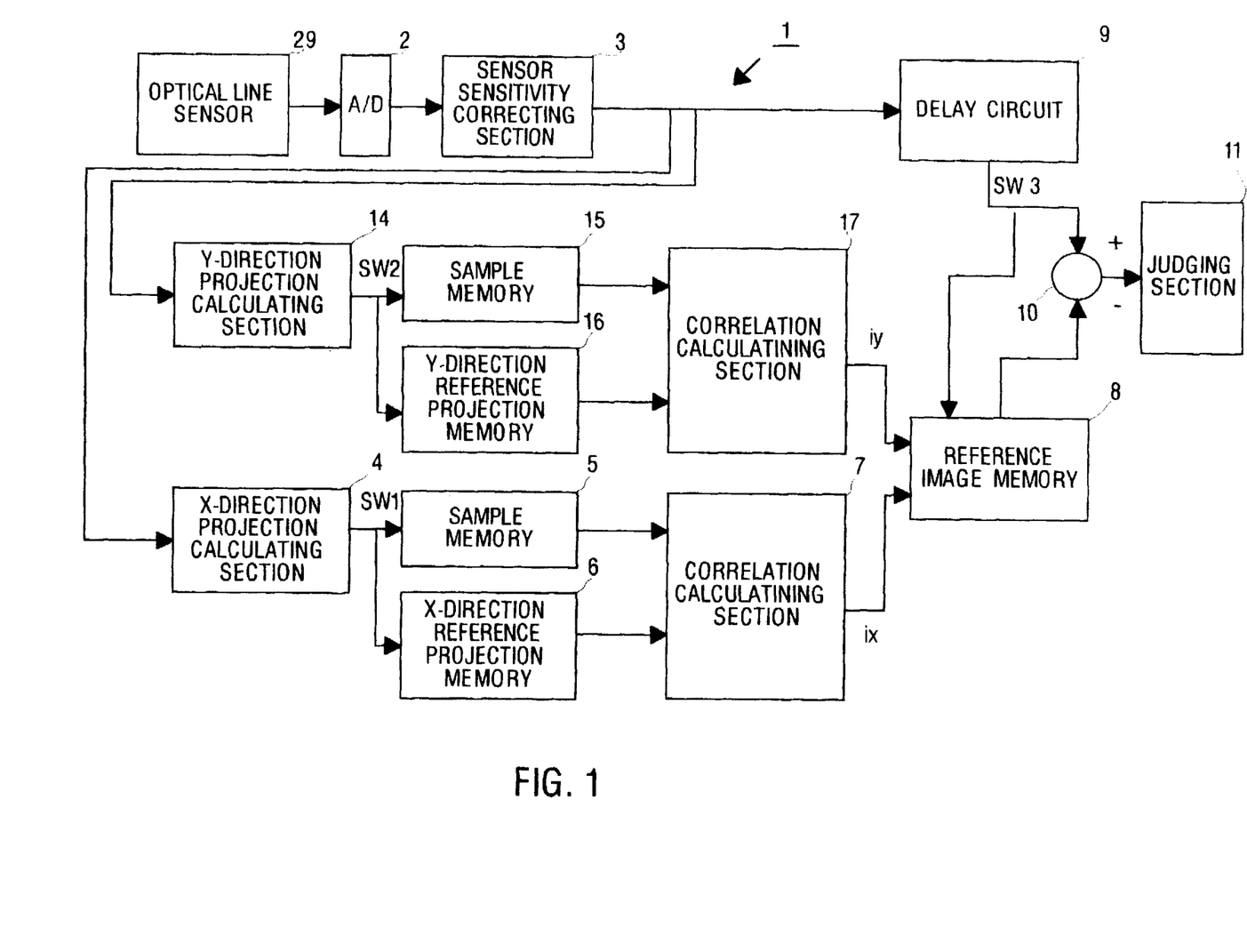
FIG. 1 is a block diagram of an image inspection device in accordance with an embodiment of the present invention.

FIG. 1 is a block diagram of the aforementioned image inspection device.

Figure 3:
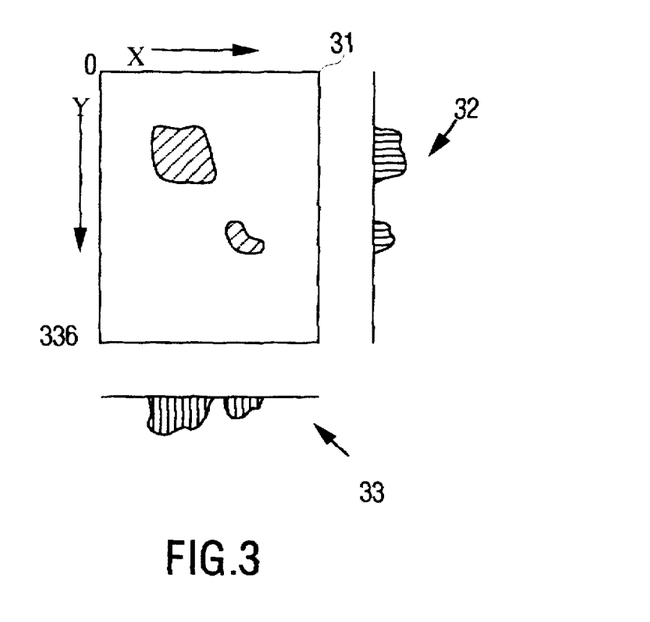
FIG. 3 is a view of an image to be inspected in the image inspection device and a projection pattern of the image.
Figure 4:
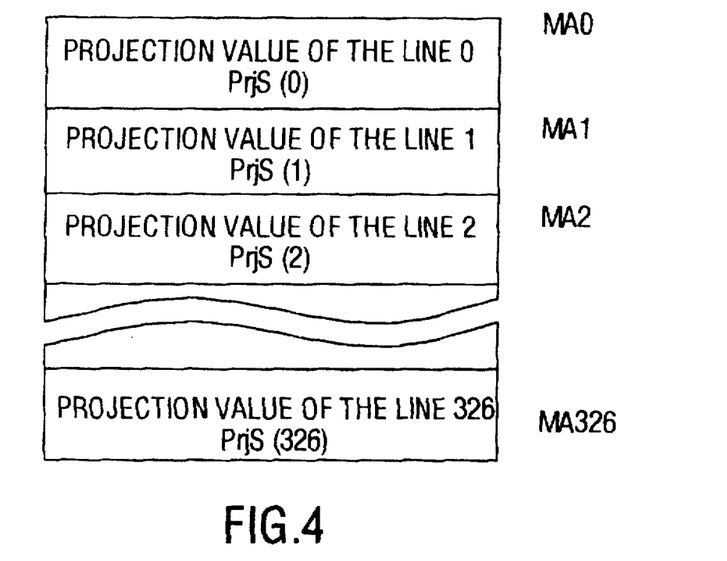
FIG. 4 is a memory map of a sample memory constituting a part of the image inspection device.

Detection data of the optical line sensor 29 is input by way of an analog-to-digital converter 2 and a sensor sensitivity correcting section 3 to an X-direction projection calculating section 4, a Y-direction projection calculating section 14, and a delay circuit 9. The X- direction projection calculating section 4 integrates the output of the optical line sensor 29 in the X direction (in a direction perpendicular to the image transfer direction) as shown in FIG. 3 to obtain an X-direction projection value of the sample image. The calculation result obtained in the X-direction projection calculating section 4 is stored in a sample memory 5. The sample memory 5 stores X-direction projection values of 0th through 326th lines of the sample image into memory areas MA0 through MA326 as shown in FIG. 4. The calculation result of the X-direction projection calculating section 4 is input to an X-direction reference projection memory 6 by operating the switch SW1. The X-direction reference projection memory 6 has the same construction as that of the sample memory 5 and stores X-direction integration values obtained through the optical line sensor 29 with regard to 0th through 326th lines of the reference image which is to be compared with the sample image in a comparing means as described hereinafter.

A correlation calculating section 7 calculates a correlation between the X-direction projection pattern of the sample image stored in the sample memory 5 and the X-direction projection pattern of the reference image stored in the X-direction reference projection memory 6 to output a variable ix corresponding to the maximum correlation value to a reference image memory 8.

Figure 5:
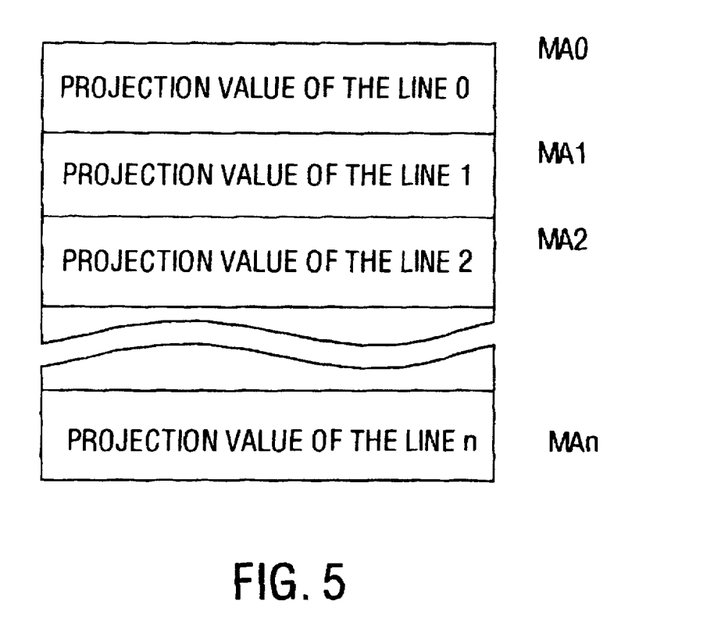
FIG. 5 is a memory map of a sample memory constituting a part of the image inspection device.

The Y-direction projection calculating section 14 integrates the detection results of the optical line sensor 29 in Y direction as shown in FIG. 3 to calculate a projection value of each line. The calculation result of the Y-direction projection calculating section 14 is input to a sample memory 15. The sample memory 15 stores projection values of 0th through nth lines respectively into memory areas MA0 through MAn as shown in FIG. 5. It is noted that the number of lines is determined according to the resolution of the optical line sensor 29. The calculation result of the Y-direction projection calculating section 14 is stored into a Y-direction reference projection memory 16 by operating a switch SW2 in the same manner as in the X direction described hereinbefore. A correlation calculating section 17 calculates a correlation between the Y-direction projection pattern of the sample image stored in the sample memory 15 and the Y-direction projection pattern of the reference image stored in the Y-direction reference projection memory 16 to output a variable iy corresponding to the maximum correlation value to the reference image memory 8.

On the other hand, the delay circuit 9 outputs to a comparing means 10 the detection data which is output from the optical line sensor 29 and corrected in the sensor sensitivity correcting section 3 after delaying the data by a specified time. The delay time in the delay circuit 9 is determined by adding up a time for the optical line sensor 29 to scan the image of one page (336 lines) and a time for carrying out processing operations in the X-direction projection calculating section 4, the correlation calculating section 7, the Y-direction projection calculating section 14, and the correlation calculating section 17. An output of the delay circuit 9 is input to a reference image memory 8 by operating the switch SW3. By operating the switch SW3, the reference image to be compared with the sample image in the comparing means 10 is read by the optical line sensor 29, and the image data of the reference image can be stored into the reference image memory 8. The comparing means 10 compares the sample image data read from the delay circuit 9 with the reference image data read from the reference image memory 8 one pixel by one pixel to output the result to a judging section 11. The judging section 11 detects the possible occurrence of smear, defective density distribution, and other defective phenomena in the sample image based on the comparison result obtained in the comparing means 10.

Figure 6:
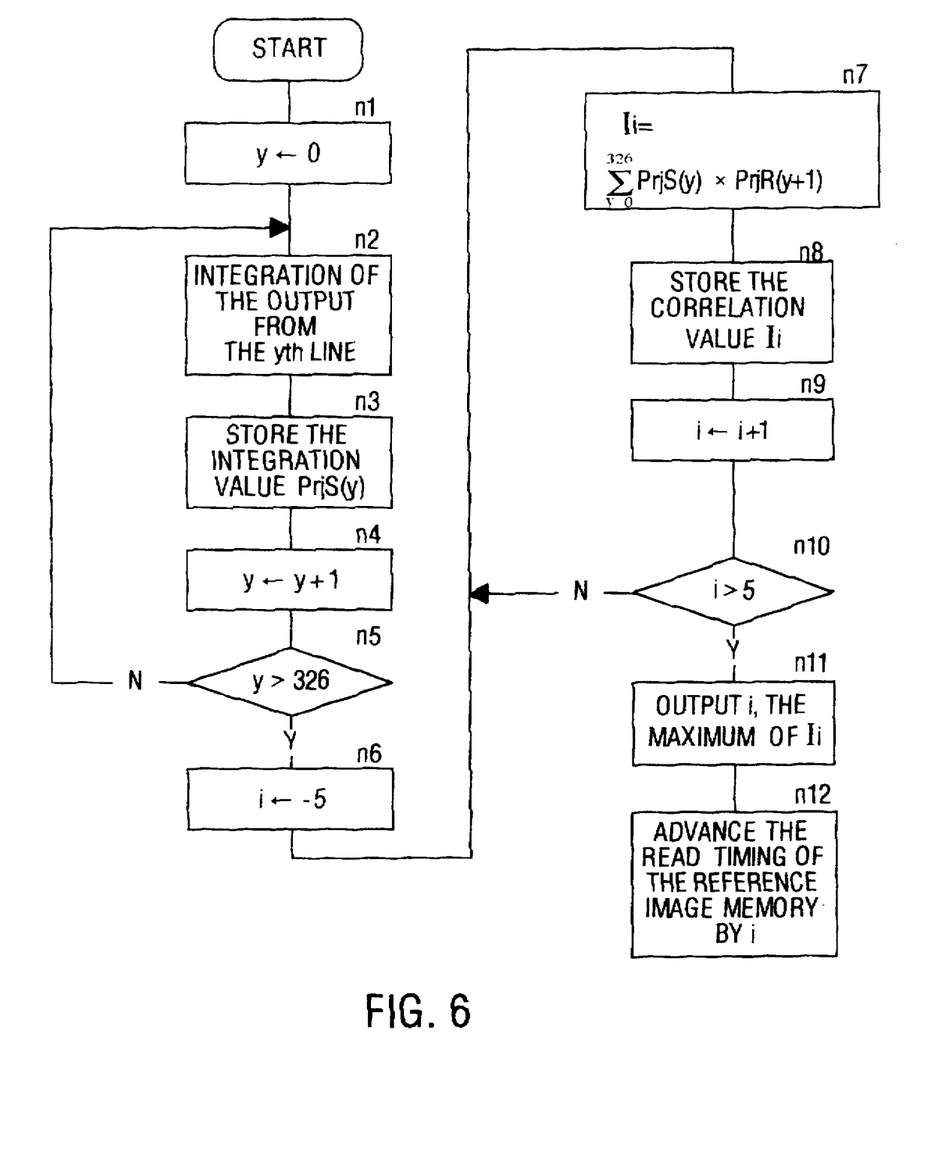
FIG. 6 is a flowchart of a processing procedure in the image inspection device.

FIG. 6 is a flowchart of a processing procedure in the aforementioned image inspection device, where a projection calculating operation in X direction is as follows. The X-direction projection calculating section 4 integrates the detection data of the optical line sensor 29 with regard to each of 0th through 326 lines (steps n1 through n5) to store the integration values into the sample memory 5.

Although an image 31 of one page is composed of the 0th through 336 lines as shown in FIG. 3, data up to the 326th line is used to reduce the processing time in the X-direction projection calculating section 4 and the correlation calculating section 7. When the projection value data of up to the 326th line are stored in the sample memory 5, a correlation calculating operation is performed in the correlation calculating section 7 according to the equation as follows:

$$Ii = \Sigma PrjS(y) \times PrjR(y+i)^{11}$$

$$y=0$$

where the variable i takes a value of −5 to 5 (steps n6 to n10).

Figure 7:
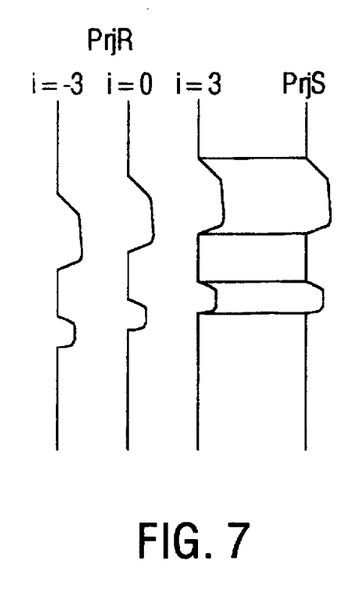
FIG. 7 is a conceptional chart of a correlation value calculation in the image inspection device.

With the above-mentioned processing operation in the correlation calculating section 7, eleven correlation values can be obtained with the variable i taking values of i=−5 through i=5. Then a variable i which makes the correlation values I take the maximum value is output as a read timing of the reference image memory 8 in the comparing means 10 (n11). In more detail, as shown in FIG. 7, the projection pattern PrjS of the sample image is multiplied by the projection pattern PrjR of the reference image at every line, and each multiplied value is integrated respectively (n7). In this case, the projection pattern PrjS of the sample image is multiplied by the projection pattern PrjR of the reference image which is displaced by −5 to 5 lines according to the value of the variable i. Therefore, the correlation value Ii becomes the maximum value when the projection pattern of the reference image at i=0 is moved by the length (difference) between the reference image at i=0 and the sample image.

For example, when the sample image is displaced upward by three lines with respect to the reference image, the correlation value I takes its maximum value when i=3. If the comparing operation is effected in the comparing means 10 neglecting the displacement error of the sample image with respect to the reference image, the image data of the sample image is to be compared with three-line lower image data of the reference image, which means that the sample image cannot be evaluated correctly. Therefore, by advancing the read timing of the reference image memory by the value of the variable i output from the correlation calculating section 7, the image data of the sample image and the image data of the reference image can be securely aligned with each other when the image data area compared in the comparing means 10, which enables correctly judging whether the sample image is flawless.

It is noted that the above-mentioned processing operation is carried out for the correlation calculation of integrated projection values in Y direction, and therefore the possible horizontal error of the image data can be corrected by means of a variable Iy output from the correlation calculating section 17.

According to the above-mentioned embodiment, the read timing of the sample image and the read timing of the reference image can be securely synchronized with each other by detecting the error in position between the sample image and the reference image through the correlation value calculation and adjusting the read timing of the reference image based on the detection result to enable correctly judging whether the image is flawless.

Figure 8:
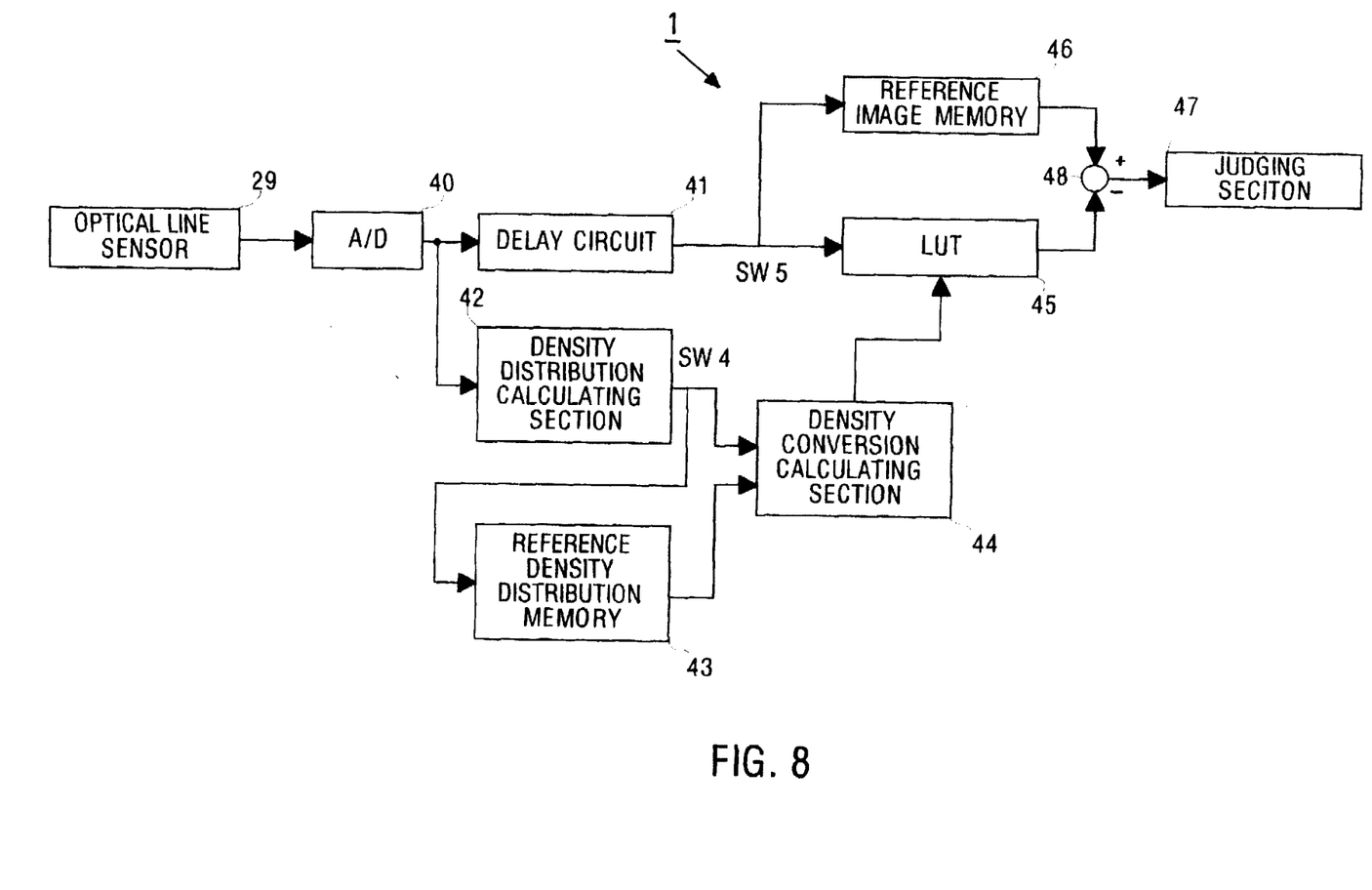
FIG. 8 is a block diagram of an image inspection device in accordance with another embodiment of the present invention.

FIG. 8 is a block diagram of an image inspection device in accordance with another embodiment of the present invention.

Detection data of the optical line sensor 29 is input by way of an analog-to-digital converter 40 to a delay circuit 41 and a density distribution calculating section 42. The density distribution calculating section 42 forms a histogram for the density for each sample image data input from the analog-to-digital converter 40. The histogram formed in the density distribution calculating section 42 is stored in a reference density distribution memory 43 by operating a switch 4. Before judging whether a sample image is flawless, the corresponding reference image is read by means of the optical line sensor 29, and the density distribution condition of the reference image is stored in the reference density distribution memory 43 by operating the switch 4. When judging whether the sample image is flawless, the density distribution of the sample image calculated in the density distribution calculating section 42 is input to a density conversion calculating section 44 together with the density distribution of the reference image prestored in the reference density distribution memory 43 to obtain a conversion equation for making the density level of the sample image approximately coincide with the density level of the reference image.

Figure 9:
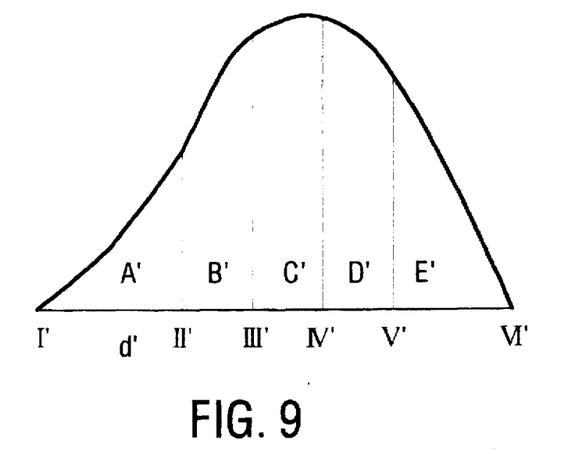
FIG. 9 is an exemplified histogram of sample image data obtained in a density distribution calculating section constituting a part of the image inspection device.
Figure 10:
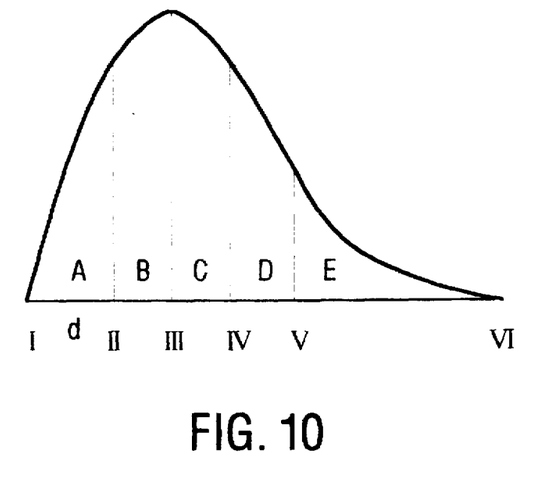
FIG. 10 is an exemplified histogram of reference image data stored in a reference density distribution memory constituting a part of the image inspection device.

The density distribution calculating section 42 forms a histogram of occurrence frequency at each density of the sample image data as shown in FIG. 9 and divides the entire range into five areas A' through E' to obtain division points I' through VI' of the areas. In the reference density distribution memory 43, division points I through VI of the reference image obtained in the density distribution calculating section 42 are stored as shown in FIG. 10. The density conversion calculating section 44 obtains a linear conversion equation for each area so that the division points I' through VI' of the density distribution of the sample image as shown in FIG. 9 coincide with the division points I through VI of the density distribution of the reference image as shown in FIG. 10. In the same manner, linear conversion equations for the other areas are obtained and stored into the look-up table 45.

The delay circuit 41 compensates for the delay of signal in the processing operations in the aforementioned density distribution calculating section 42 and the density conversion calculating section 44. In other words, the sample image data read by means of the optical line sensor 29 is converted into a density value in the look-up table 45 through the linear conversion equation obtained by the density conversion calculating section 44. Therefore, the delay circuit 41 delays the timing of inputting the sample image data into the look-up table 45 until the processing operations in the density distribution calculating section 42 and the density conversion calculating section 44 complete. The output of the delay circuit 41 is input to a reference image memory 46 by operating a switch SW5. By operating the switch SW5, the output of the optical line sensor 29 which has read the reference image can be prestored in the reference image memory 46. As described above, sample image data which has undergone a conversion into a density value in the look-up table 45 based on the difference in level between the sample image and the reference image is compared in a comparing means 48 with the reference image data stored in the reference image memory 46, and the comparison result is output to a judging section 47. The judging section 47 detects the possible occurrence of smear and density nonuniformity based on the comparison result.

According to the above-mentioned embodiment described as above, the sample image data is firstly subject to conversion into a density value in the look-up table 45 and then compared with the reference image data. For example, when the sample image data has a density of d' as shown in FIG. 9, the sample image data is subject to the linear conversion in the look-up table 45 to have a density of d as shown in FIG. 10. Since the sample image is preparatorily converted to be compared with the reference image in the corresponding position, a significant difference takes place between the sample image data and the reference image data only when smear, density nonuniformity occur in the sample image. The above-mentioned embodiment is capable of comparing the sample image data with the reference image data after converting the sample image data so that the density distribution of the sample image approximately correspond to the density distribution of the reference image, and correctly detecting only such defective phenomena as smear and density nonuniformity occurring in the sample image without detecting any sample image whose density level is varied uniformly with respect to the reference image as a defective image. Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An image inspection device comprising:
   reference image memory means for storing reference image data;

projection value memory means for storing projection values of the reference image data projected along at least a first direction;

optical sensor means for generating sample image data;

projection calculation means for calculating projection values of the sample image data along at least the first direction;

correlation calculating means for calculating a correlation value between the sample image data and the reference image data based on the projection values of the sample image data calculated by the projection calculation means and the projection values of the reference image data stored in the projection value memory means;

reading means for reading the reference image data from the reference image memory means in accordance with the correlation value calculated by the correlation calculating means so that the reference image data read from the reference image memory means is correlated with the sample image data generated by the optical sensor means; and comparison means for comparing the sample image data with the reference image data read by the reading means.

2. An image inspection device according to claim 1, wherein said correlation value calculated by said correlation calculating means is based on X-direction and Y-direction projection values of said sample image data calculated by the correlation calculating means and X-direction and Y-direction projection values of the reference image stored in the projection value memory means.

3. An image inspection device according to claim 2, wherein said correlation calculating means calculates a plurality of correlation values and said reading means reads the reference image data from the reference image memory means in accordance with a maximum one of the plurality of correlation values.

4. An image inspection device according to claim 1, further comprising delay means for delaying an input of said sample image data to said comparison means for a specified period.

5. An image inspection device comprising:

reference image memory means for storing reference image data;

optical sensor means for generating sample image data;

Y-direction projection calculating means for calculating a Y-direction projection value of the sample image data;

X-direction projection calculating means for calculating an X-direction projection value of the sample image data;

Y-direction reference projection memory means for storing Y-direction reference projection values of the reference image data stored in the reference image memory means;

X-direction reference projection memory means for storing X-direction reference projection values of the reference image data stored in the reference image memory means;

Y-direction sample projection memory means for storing Y-direction projection values of the sample image data calculated by the Y-direction projection calculating means;

X-direction sample projection memory means for storing X-direction projection values of the sample image data calculated by the X-direction projection calculating means;

Y-direction correlation calculating means for calculating a Y-direction correlation value based on the Y-direction reference projection values stored in the Y-direction reference projection memory means and the Y-direction sample projection values stored in the Y-direction sample memory means;

X-direction correlation calculating means for calculating an X-direction correlation value based on the X-direction reference projection values stored in the X-direction reference projection memory means and the X-direction sample projection values stored in the X-direction sample memory means;

reading means for reading the reference image data from the reference image memory means in accordance with the Y-correlation value and the X-correlation value so that the reference image data read from the reference image memory means is correlated with the sample image data generated by the optical sensor means; and comparison means for comparing the sample image data and the reference image data read by the reading means.

6. The image inspection device of claim 5 further comprising delaying means, disposed between the optical sensor means and the comparison means, for delaying the sample image data for a time period equal to at least a time period needed by the Y-direction projection calculating means to calculate Y-direction projection values of the sample image data, the X-direction projection calculating means to calculate X-direction projection values of the sample image data, the Y-direction correlation calculating means to calculate a Y-direction correlation value, and the X-direction correlation calculating means to calculate an X-direction correlation value.

* * * * *